United States Patent
Gravelle et al.

(10) Patent No.: US 10,346,648 B2
(45) Date of Patent: *Jul. 9, 2019

(54) AUTOMATIC MODE DETECTION IN A DUAL OPERATING MODE RFID TAG

(71) Applicant: Amtech Systems, LLC, Albuquerque, NM (US)

(72) Inventors: Kelly Gravelle, Poway, CA (US); Robert W. Tiernay, Arden (CA); Dale L. Scott, Albuquerque, NM (US); Charles A. Johnson, Albuquerque, NM (US); Filip Weytjens, Bree (BE); Matthew K. Burnett, Albuquerque, NM (US)

(73) Assignee: AMTECH SYSTEMS, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,739

(22) Filed: Jun. 11, 2018

(65) Prior Publication Data

US 2018/0293413 A1    Oct. 11, 2018

Related U.S. Application Data

(63) Continuation of application No. 15/447,733, filed on Mar. 2, 2017, now Pat. No. 9,996,715, which is a continuation of application No. 15/058,687, filed on Mar. 2, 2016, now Pat. No. 9,607,190, which is a continuation of application No. 14/090,419, filed on
(Continued)

(51) Int. Cl.
| | |
|---|---|
| *G06K 7/10* | (2006.01) |
| *G06K 19/07* | (2006.01) |
| *H04Q 5/22* | (2006.01) |

(52) U.S. Cl.
CPC ..... *G06K 7/10198* (2013.01); *G06K 19/0707* (2013.01); *G06K 19/0712* (2013.01); *G06K 19/0723* (2013.01); *H04Q 5/22* (2013.01)

(58) Field of Classification Search
CPC .............. G06K 19/0723; G06K 7/10297
See application file for complete search history.

(56) References Cited

U.S. PATENT DOCUMENTS

| | | | |
|---|---|---|---|
| 6,249,212 B1 * | 6/2001 | Beigel | G06K 7/10297 340/10.34 |
| 6,614,387 B1 * | 9/2003 | Deadman | G01S 13/825 340/435 |

(Continued)

*Primary Examiner* — Nabil H Syed
(74) *Attorney, Agent, or Firm* — Snyder, Clark, Lesch & Chung, LLP

(57) ABSTRACT

A multi-mode, preferably dual mode, radio frequency identification (RFID) tag is adapted for automatic detection of whether a RFID reader located within communication range of the RFID tag is transmitting a continuous wave (CW) or modulated wave types of RF signal, and accordingly, mandating a response from the tag in read-only (RO) mode or read/write (R/W) mode, respectively. The tag includes means for designating one of the RO and R/W operating modes as a default mode of the tag, and for switching the tag from its default mode to its other operating mode, and vice versa, according to a rule for determining the frequency of occurrence of a selected event related to signal type of the reader. A device-implemented method of this automatic detection, and a method of fabricating the tag, are also disclosed.

14 Claims, 5 Drawing Sheets

Related U.S. Application Data

Nov. 26, 2013, now Pat. No. 9,313,559, which is a continuation of application No. 13/468,371, filed on May 10, 2012, now Pat. No. 8,618,916, which is a continuation of application No. 11/139,681, filed on May 31, 2005, now Pat. No. 8,198,985.

(56) References Cited

U.S. PATENT DOCUMENTS

2004/0134984 A1* 7/2004 Powell ................. G06K 7/0008
                                                              235/451
2005/0206552 A1* 9/2005 Friedrich ............. G06K 7/0008
                                                               342/42

* cited by examiner

A)

RF ENVELOPE FROM READER TRANSMITTER

B)

MODULATION FROM TAG ASIC

C)

RESULTANT WAVEFORM FROM ASIC's DATA DETECTOR

D)

FALLING EDGES DETECTED

AUTOMATIC MODE DETECTION IN A DUAL OPERATING MODE RFID TAG

CROSS-REFERENCE TO RELATED APPLICATIONS

This application is a continuation of U.S. patent application Ser. No. 15/447,733 filed on Mar. 2, 2017; which is a continuation of U.S. patent application Ser. No. 15/058,687, filed on Mar. 2, 2016 now U.S. Pat. No. 9,607,190; which is a continuation of U.S. patent application Ser. No. 14/090,419, filed on Nov. 26, 2013, now U.S. Pat. No. 9,313,559; which is a continuation of U.S. patent application Ser. No. 13/468,371, filed on May 10, 2012, now U.S. Pat. No. 8,618,916; which is a continuation of U.S. patent application Ser. No. 11/139,681, filed on May 31, 2005, now U.S. Pat. No. 8,198,985; all of which are hereby incorporated herein by reference.

FIELD OF THE INVENTION

The present invention relates generally to radio frequency (RF) communication devices, particularly radio frequency identification (RFID) tags designed and adapted to operate in either read-only (RO) mode or read/write (R/W) mode, i.e., dual operating mode RFID tags, and, more particularly, to methods of and devices for performing automatic mode detection in such tags to enable an appropriate readout of the tag's memory content.

BACKGROUND OF THE INVENTION

Typically, radio frequency identification (RFID) tags are secured on or in movable items. In certain instances, the tag may be placed on a container for a multiplicity of the same items, rather than on the items themselves. The identity of and perhaps other information relating to the tagged item is stored in its tag, and is transmitted by the RFID tag to a remote RFID interrogator, or reader, in response to a scan, query or command from a reader within the response range of the tag, i.e., a range suitable for RF communication between reader and tag. In its simplest form, the conventional RFID tag consists of a transponder and an antenna. Sometimes, the RFID tag itself is referred to as a transponder.

RFID tags may be either passive or active. A passive RFID tag lacks an internal self-sufficient power supply, e.g., a battery, and relies instead on the incoming RF beam (in this example, a query by the reader) to produce sufficient power in the tag's internal circuitry to enable the tag to transmit a response. In essence, the query induces a small electrical current in the tag's internal antenna, which serves as the power source that enables a reflected or backscattered response in a read-only mode. Accordingly, a passive RFID tag is generally limited in the amount of data that can be furnished in its response, e.g., an ID number and perhaps a small amount of additional data. But the absence of a battery leads to certain advantages, primarily that a passive tag can be fabricated at much less cost and with considerably smaller size than an active tag. Among other current uses, passive RFID tags may eventually replace the ubiquitous universal product code (UPC), the bar code strip found on myriad products in the stream of commerce—the imprinted strip requiring a line of sight optical scan to produce the UPC readout and the resulting computerized display or printout of price (at a point of sale of the bar-coded product) and other information regarding the product.

The on-board battery of an active RFID tag can give the tag a greater response range, along with greater accuracy, reliability and data storage capacity, but the active tag has the aforementioned disadvantages of cost and size relative to the passive tag. The battery itself is quite small by present day standards, but not enough to overcome the size disadvantage.

The principles of the present invention are equally applicable to passive and active RFID tags.

A typical conventional RFID tag reader employs a transceiver, a control unit and an antenna for communicating with the tag at a designated RF frequency among several allocated for this purpose. An additional interface such as RS 232, RS 485, or other, may be provided with the reader to allow data received from the tag to be forwarded to another system.

Historically, the RFID tag has constituted a read-only (RO) device, capable of transmitting only fixed, invariable information stored in the tag memory of the integrated circuit chip in which the tag is fabricated, as backscatter readout when the tag is scanned by the reader in an RF communication between reader and tag. More recently, read/write (R/W) RFID tags have been developed, which are adapted to be programmed or altered in memory content by write data received by the tag in the reader's RF beam. Data is stored in the tag memory such as an electrically-erasable programmable read-only memory, or EEPROM, and may consist of original data, an overwrite of previously stored data, refreshed data, and/or entirely new data, which is then available for readout from the R/W RFID tag upon the tag's receipt of a scan (in this example, a command) from a RFID reader.

A RFID reader transmits a continuous wave (CW, i.e., non-modulating) scan at the designated RF communication frequency to interrogate a remote RFID tag, and in response, receives an automatic backscatter RF signal transmitted by the tag, containing RO data stored in the tag's memory. Communication with a R/W RFID tag requires a RFID reader that transmits a modulated RF signal (in contrast to the CW RF signal generated by a reader for acquiring RO data from a tag) by which data is provided to the tag for programming (overwriting) or to initiate other functions of the tag.

A RFID tag that is implemented according to the present invention to perform in either mode of operation, RO or R/W, according to whether it receives a CW or modulated incoming RF command signal from the reader, is termed herein as a dual mode tag. The dual mode tag may be equipped with an EEPROM device to serve both the read-only operation and the read/write operation. As used in this specification, the term "read-only" refers not to the type of memory, but rather, in the RFID sense of a tag that operates, when it is powered up, to send the same data continuously and repeatedly. In the case of a tag that operates only in the RO mode, it does nothing else but to perform this repeated transmission. In contrast, the term "dual mode" refers to a tag's ability to operate in an agile way to sense whether the reader is interrogating or commanding with a CW signal or a modulated signal, and to respond accordingly with read-only operation or with read/write operation, whichever is appropriate.

A dual mode RFID tag is desirable in situations where the same tag is or may be subjected to two or more different applications in the normal course of use or exposure of the item, object or product that bears the tag. For example, a vehicle may be provided with a RFID-tag to allow the vehicle to be machine-recognized as being authorized to participate in a system for automatic collection (as by debiting) of a toll upon the vehicle passing a scanning point at which a remote reader is located, such as at a toll collection station along a highway or an entry point in a parking garage or lot. Or the RFID tag may identify the vehicle to the remote reader as being authorized to enter the grounds of a secure facility or area outfitted with access control gates, so as to automatically raise the gate as the vehicle approaches the gated entry point and is so identified. Other system applications abound, including those in which RFID tagged badges are issued to be worn by employees authorized by various levels of access within a secure facility. And a particular system may be used in several different locations or in several different applications. With the passage of time, the particular system may be upgraded, or planned by its owner or operator to migrate, from a simple read-only technology to a somewhat more complex read/write technology.

In such circumstances, a period of time exists during which RFID readers must be provided to read both legacy (originally issued) RO tags and newly issued R/W tags. A difficulty arises because the newly issued R/W tags will not operate with some or even many of the multiplicity of roadway, parking, airport and garage applications with which the older tags had been designed to operate, unless all of the applications are upgraded concurrently. And the older tags may be inoperable in the upgraded systems or applications. In these instances, it becomes essential to provide tags that are configured to operate in both modes, RO and R/W, to enable usage and proper system performance in all of these applications.

In another application where a dual mode RFID tag is advantageous, a multi-level or multi-step system may be used for enabling or denying access to different areas of a secure facility. The facility may have one level of security for individuals to gain access to an outer portion of the facility, and a higher level of security for access to an inner portion of the facility. At entrances to the lower level of secure access, RFID readers may be used to perform a simple CW scan of employee badges containing a RFID tag, which produces a RO response to allow admission past the security stations. The badges of employees who have been granted the higher security level, however, may utilize dual mode tags that provide not only the RO response at the lower level entrances, but an additional appropriate response to R/W readers stationed at one or more entrances to the higher security portion of the facility.

Thus, at least two distinct advantages exist for providing a dual mode RFID tag, in which the operating modes are both a CW (RO) response and a modulated signal (R/W) response. One of these advantages is the capacity for interoperability between independent applications, and the other is the provision of a distinct migration path from one response type to the other for independent applications.

Prior mode detection schemes for dual mode RFID tags are inefficient and slow to respond, especially to support moderate to high speed applications of the tags and readers, and therefore have been found to lower system margin. System margin is tantamount to a figure of merit based upon the number of times a given type of transaction can be completed or the number of times a given set of frames can be read in a given time interval. A typical frame of interest has a length of 128 bits of data, and includes appropriate frame markers. The greater the number of transactions that can be accommodated in the given time interval, the higher the system margin. High system margin is especially important in moderate to high speed dynamic applications such as "on the fly" toll tracking and collection systems that rely on RFID tag reading as vehicles pass at or near highway speed through a designated unmanned toll collection lane or lanes of a toll plaza.

It would be desirable to detect and comply with a command in an RF signal from a remote reader to a dual mode RFID tag by a method and means of automatic mode detection, and where appropriate, consequent mode switching or mode assumption that optimizes the number of transactions that can be handled in a given time period.

As used in this patent specification, the term "mode detection" is intended to refer to recognition by a dual mode RFID tag of a directive, command or instruction contained in an incident RF signal for the tag to respond in an operating mode consistent with such command; and the term "automatic mode detection" is intended to refer to a tag performing such mode detection, and when applicable, to undergo mode switching from one to the other when it is not already in the proper mode called for by the reader's command, or to undergo mode assumption, promptly and without need for any type of manual intervention. The term "mode assumption" is intended to mean a dual mode RFID tag commencing the correct operating mode from a condition in which the tag is idle, inactive, or shut off, but in readiness to receive the command as an incoming RF signal from a nearby RFID reader. And the terms "mode switching," and "mode change," are used interchangeably herein and intended to refer to a dual mode RFID tag undergoing a change in operating mode from RO to RW, or vice versa, regardless of how the switch or change is manifested.

SUMMARY OF THE INVENTION

It is a principal object of the present invention to provide a dual mode RFID tag having the ability and agility to detect and promptly assume the operating mode mandated by the RF signal transmitted by a reader in communication range of the tag, according to whether the reader is CW (calling for response in RO mode) or modulated (calling for response in R/W mode). A related object is to provide a dual mode RFID tag adapted to undergo prompt mode switching according to a rule that determines the frequency of occurrence of an event related to whether the RF is CW or modulated. Still another object of the invention is to provide such a dual mode RFID tag to enable an optimum number of transactions to be conducted or handled by the RFID system in a minimum amount of time.

According to an aspect of the invention, a device-implemented method of automatic mode detection is performed by a dual mode RFID tag adapted to operate in either of a RO mode or a R/W mode. The device-implemented method automatically detects the operating mode asserted by the RF signal from a RFID reader located within communication range of the dual mode RFID tag according to whether the reader transmits a CW type signal or a modulated type signal. "Asserted" refers to the mode in which the reader whose RF signal is detected by the tag is seeking or mandating a response by the tag, according to the reader's signal type (CW or modulating). The detection then evokes a response from the dual mode RFID tag in the asserted mode. The method includes the steps of assuming a programmed dominant one of the RO and R/W operating modes, and if the dominant mode is not the asserted mode, switching to the other operating mode according to a rule implemented at least in part by criteria to determine the frequency of occurrence of a selected event related to the signal type of the reader over a designated time interval. The switching rule may be implemented in further part by criteria to compare the level of the RF signal from a reader detected by the tag to a threshold level.

According to another aspect of the invention, the dual mode RFID tag includes circuit means for causing the tag to assume a programmed dominant one of the RO and R/W operating modes. If the dominant mode is not the mode asserted by the reader's RF signal, the circuit means switches the tag to the other operating mode according to criteria imposed by the rule referred to in the immediately preceding paragraph.

Preferably, the selected event whose frequency is to be determined is the falling edge of a waveform derived from the reader's RF signal detected by the tag.

According to a feature of the present invention, the dominant operating mode is the default mode of the tag, and the circuit means causes the tag to revert to the default mode each time the RF signal from a reader that asserted the other operating mode is no longer detected by the tag.

According to another feature of the invention, the switching rule is implemented to establish a degree of reluctance that must be overcome for the tag to switch from its default mode to its other operating mode when asserted by an RF signal from a reader. The switching rule may also be implemented to establish a degree of acceptance of the tag considerably less stringent than the degree of reluctance, to switch from the other operating mode back to the default mode when asserted by an RF signal from a reader.

According to another aspect of the invention, a method is provided for fabricating a dual mode RFID tag adapted to operate in either a RO mode or a R/W mode for automatically detecting the operating mode mandated by the RF signal from a RFID reader located within communication range of the dual mode RFID tag, wherein the reader is either CW or modulated, so as to evoke a response from the tag in the mandated mode. The method includes the step of implementing means to adopt one of the RO and R/W operating modes as a default mode of the tag, and if the default mode is not the asserted mode, to switch the tag to the other operating mode according to a rule that designates an event related to signal type of the reader and determines the frequency of occurrence of the designated event.

Still another aspect of the invention resides in dual mode RFID tag adapted to operate in either RO mode or R/W mode, for automatically detecting the operating mode mandated by the RF signal from a RFID reader located within communication range of the tag, whether the RF signal is transmitted by a CW reader or by a modulated reader, so as to evoke a concomitant response from the tag. The tag includes means for designating one of the RO and R/W operating modes as a default mode of the tag, and for switching the tag from its default mode to its other operating mode according to a rule that determines the frequency of occurrence of a selected event related to whether the reader is CW or modulated.

Therefore, another object is to provide a method of automatic detection of the proper operating mode to be assumed by a dual mode RFID tag associated with an item of commerce, for response to commands contained in readers' RF signals, including establishing detection rules for each of different types of commands, so the tag will provide a response mode that satisfies the established detection rules.

Yet another object is to provide a RFID tag having a logic circuit that enables rapid switching of the tag between its dual operating modes to respond accordingly to either of the different types of RF signal scan from CW and modulated readers, to accommodate high speed applications.

BRIEF DESCRIPTION OF THE DRAWINGS

The above and still further objects, aims, features, aspects and attendant advantages of the invention will become clear to those skilled in the art from a consideration of the following detailed description of the best mode presently contemplated for carrying out the principles of the invention, including alternative embodiments and implementations, taken in conjunction with the accompanying Figures of drawing, in which.

Figure 1A:
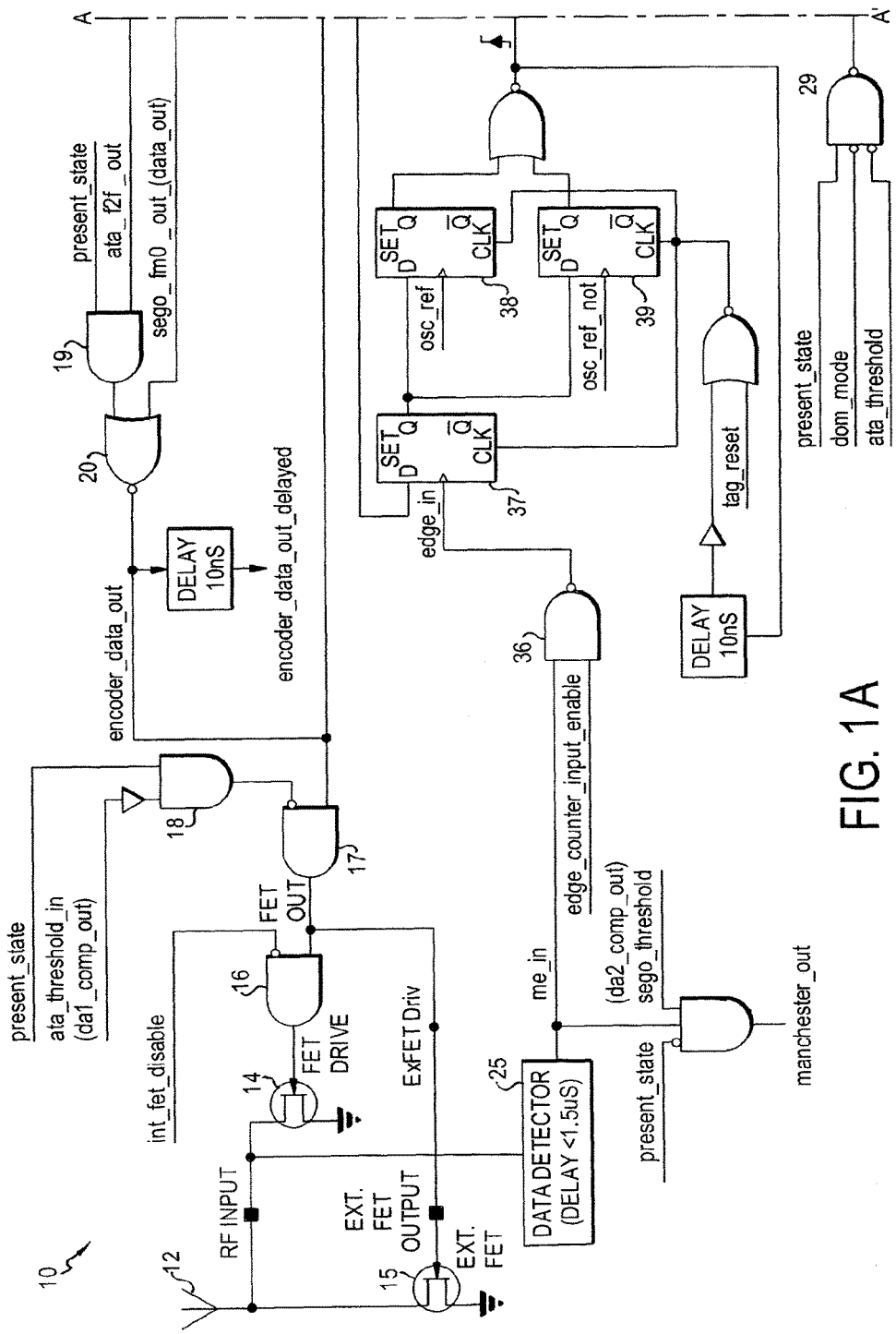
FIG. 1, comprised of 1A and 1B, is a circuit diagram of an automatic mode detection and mode switching circuit for a dual mode RFID tag, in accordance with a presently preferred embodiment and method of the invention.

DETAILED DESCRIPTION OF A PRESENTLY CONTEMPLATED BEST MODE OF PRACTICING THE INVENTION

In describing a preferred embodiment of the invention illustrated in the drawings, certain specific terminology will be used for the sake of clarity. However, the invention is not intended to be limited to that specific terminology, and it is to be understood that the terminology includes all technical equivalents that operate in a similar manner to accomplish the same or similar result.

Figure 1B:
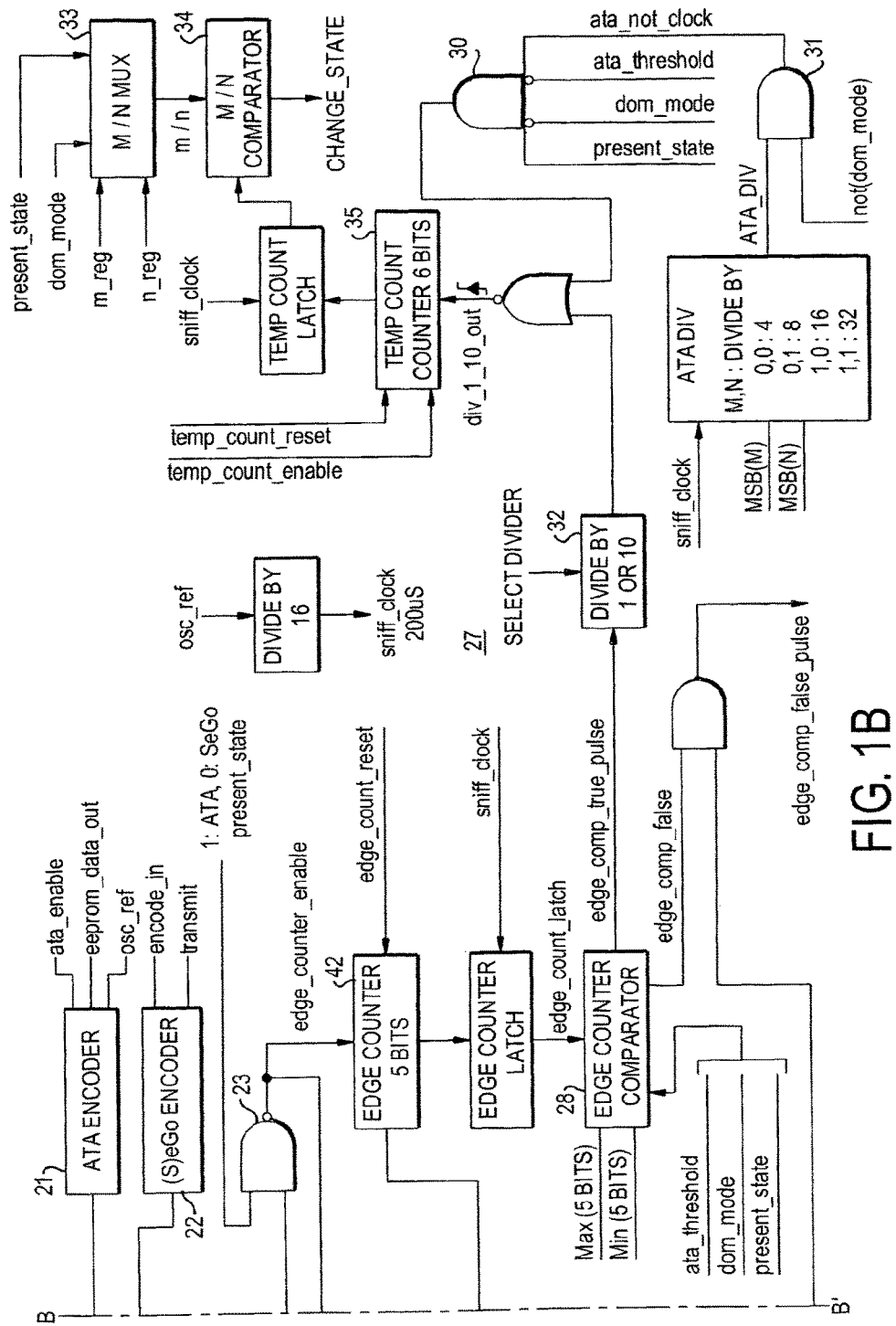
Figure 2A:
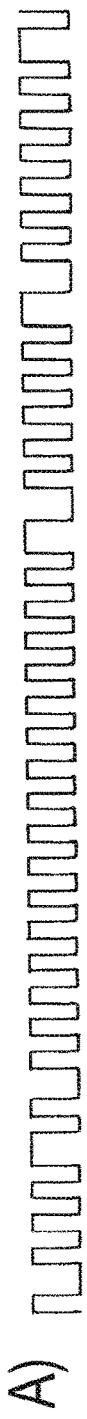
FIGS. 2A, B, C and D are waveform diagrams at various stages of processing of an exemplary RF signal used to trigger operation of the circuit of FIG. 1 for automatic mode detection and mode switching.
Figure 2B:
Figure 2C:
Figure 2D:

Referring now to FIG. 1, a logic circuit is implemented in integrated circuit (IC) form, and in particular, as an application specific integrated circuit (ASIC) 10, either within the IC chip in which the dual mode RFID tag is fabricated, or on a separate chip electrically connected to the IC chip of the RFID tag. If the RFID tag is passive, logic circuit 10 is powered in the same way as the typical transponder is powered; that is, by the DC voltage that is obtained from conversion of the RF beam incident on the tag's antenna from an interrogating RFID reader. If the tag is active, it is implemented with a battery for its internal power supply. Logic circuit 10 is implemented in its ASIC architecture to perform automatic mode detection and to assure rapid compliance of mode selection therewith by the RFID tag, so as to render the tag highly agile in responding appropriately to the type of RF signal received from the RFID reader, either CW (calling for a RO response from the tag) or modulated (calling for a R/W response from the tag).

The ASIC logic circuit 10 is connected between the tag's antenna 12 and the input to its transponder. The front end of the ASIC includes field effect transistors (FETs) 14, 15, the latter supporting a backscatter response to a scan of the RFID tag, whether active or passive. The logic circuit also comprises, among other components, various AND (or NAND) gates 16, 17, 18, 19 and 23, OR gate 20, a read-only protocol encoder 21 and read/write protocol encoder 22, and their respective inputs and outputs. The ASIC's front end is implemented to obtain digital signal information from the RF input signal received at antenna 12 and to detect whether the signal is modulated or CW. If a modulated signal is detected, it is subjected to further processing by logic circuit 10 including the operation of a data detector 25 and an edge detector 27.

RO encoder 21 is labeled "ATA" in the presently preferred embodiment of FIG. 1, which is merely an internal designation for a protocol that, when activated, continuously scrolls 128 bits of specific data at a specific rate and in a specific format for the RO response of the RFID tag. This is referred to as RO protocol, or simply as "read-only" or "RO," hereinafter. Similarly, R/W encoder is given the internal label "SeGo" in the Figure, which is an internal designation for a protocol that, when activated, produces the R/W format for the R/W response of the tag, and will be referred to hereinafter, except occasionally, by the terminology "read/write" or "RW".

Turning for the moment also to FIG. 2, the envelope of an exemplary RF signal received by the tag from a modulated RFID reader is illustrated by the waveform in part A of the Figure. Modulation from the tag's ASIC 10 is exemplified by the waveform of part B of FIG. 2. The resultant output waveform from data detector 25 is illustrated in part C of the Figure. The falling edges of the data detector's output waveform, illustrated in part D of FIG. 2, are detected by edge detector 27.

Referring again as well to FIG. 1, certain parameters, or variables, are used to configure the logic circuit 10, and by extension, the RFID tag itself. These configuration variables include a Dominant Bit, and numbers M (or m), N (or n), Min, and Max, whose values are set to assist in establishing rules within the tag for automatic detection of the operating mode dictated by the incoming RF signal ("automatic mode detection"). The Dominant Bit ("dom_mode") is a configuration variable (either "0" or "1") applied to multiple AND gates 29, 30 and 31 (in the latter case as "not(dom_mode)"), as well as to edge count comparator 28 and M/N multiplexer (M/N mux) 33. "Min" and "Max" are configuration variables applied to edge count comparator 28; "m" (or "M") and "n" (or "N") are configuration variables ("m_reg" and "n_reg", respectively) applied to M/N mux 33. The "m_n" output of the multiplexer 33 is delivered to M/N comparator 34, which, depending on that input and an additional input from a temporary count latch, may generate a "change_state" (or "change mode", being the same) command to the tag's transponder.

A Dominant Bit of "1" configures the dual mode RFID tag with the read-only (RO) operating mode as its dominant state or mode, and a Dominant Bit of "0" configures the tag with the read/write (R/W) operating mode being dominant. Of course, this assignment of the value of the Dominant Bit is completely arbitrary and is not a limitation on the invention—the value "1" might just as easily have been used for defining the R/W mode, and the value "0" used to define the RO mode. It is to be anticipated that certain dual mode tags will encounter more readers of one type (e.g., CW, asserting a desired response by the tag in RO mode) than of the other type (e.g., modulating, asserting a desired response by the tag in R/W mode) when the tag is scanned. And some new tagged products with tags operating in the R/W mode may need dominant settings to assure performance levels achieved by older tagged products. The ASIC 10 can operate only with the "dom_mode" set one way or the other, and the value of this bit defines the ASIC's default operating mode. Hence, upon completing a boot-up, the tag will commence operating in that default state, whether it is the RO mode or the R/W mode. The "dom_mode" bit also sets an "acceptance" or a "reluctance" factor when the tag is switched from one mode to the other.

For example, if the "dom_mode" bit is set for RO dominance (causing the tag to operate by default in its RO operating mode), then the rule for changing or switching the tag to the R/W operating mode will be stringent or "reluctant." Reluctance indicates a greater degree of difficulty imposed by criteria implemented according to the rule for switching operating modes, i.e., a reluctance of the state machine to switch, from its preset dominant operating mode to its other mode. This reluctance is manifested by a need for several hurdles imposed by such criteria to be overcome before the tag can switch modes from RO to R/W (in the context of this example, but a similar situation applies if R/W were the dominant mode, and a switch to the RO mode is asserted by the incoming RF signal from the reader).

Continuing with this example, according to the invention the criteria imposed by the "reluctance" rule to be overcome for the tag to undergo mode switching from its dominant operating mode to its non-dominant (or "recessive") operating mode, are as follows: The incoming RF signal must (1) exceed a factory-preset R/W RF threshold (although factory presetting is preferred for the embodiment under discussion here, that threshold could be set in the field if desired), (2) result in the detection of a number of falling edges in the signal that lies between the numbers assigned at the outset to the "Min" and "Max" configuration variables, and (3) result in that detection in "N".times.200-microsecond (200 .mu.sec, or 200 M*10) windows, where "N" is a preassigned number for this configuration variable.

In other words, the rule for switching from the dominant, or default mode, to the non-dominant mode is implemented, at least in part, according to the frequency of occurrence of an event of interest related to the reader's signal type. In this particular case, the event is a falling edge of a waveform derived from the reader's RF signal detected by the tag, over a designated time interval. And to a lesser extent, this stringent or reluctant rule is implemented in further part by a comparison of the level of that RF signal to a specified threshold level.

After the dual mode RFID tag is switched to its non-dominant operating state (R/W in this example), the rule for changing or switching the tag back to its dominant read-only mode (prompted in this example by the tag encountering—i.e., being scanned or commanded by—a CW reader) shifts to a much less rigorous or stringent one, arbitrarily termed "acceptance." Acceptance is manifested as a considerably lesser degree of difficulty for returning the tag to its dominant (default) operating mode (i.e., a bias toward accepting a change from the non-dominant to the dominant mode), compared to the "height" of the barrier established by criteria imposed by the "reluctant" rule to switch the tag from its dominant to its non-dominant operating mode.

The "acceptance" rule is met (to cause a return to the RO state as the dominant mode in this example) if, over a prescribed period of time defined by (10.times."M") 200 .mu.sec windows, the tag detects a number of falling edges of the processed incoming RF signal less than the number assigned to the variable "min." And it goes without saying that very few, if any, edges would be expected to be detected in the processed incoming RF signal, since in this specific example, the RFID reader encountered by the tag is, by definition (subject to the caveat below), CW. A further albeit lesser determination made by the "acceptance" rule resides in a comparison of the level of the reader's RF signal to a specified threshold level, but in the particular case of the RO mode being the default mode, reversion to that mode will occur irrespective of whether or not that detected signal level exceeds the threshold. In fact, the mere disappearance of the previously detected modulating signal from a reader would cause a return of the tag to its default RO mode.

Similarly, if the ASIC is configured (by the setting of the appropriate configuration variables) for dominance of the R/W mode, the rule for changing to the RO mode becomes "reluctance." To overcome this reluctance, (1) the incoming RF signal should exceed or at least meet a RO threshold (preferably also preset at the factory for the embodiment of this example, but alternatively, may be set in the field), and (2) the number of falling edges detected in the resultant output waveform from data detector 25 of ASIC 10 (as represented by part D of FIG. 2) must be less than the number assigned to the configuration variable "Max" for (10.times."M") consecutive 200 .mu.sec windows, where "M" is the pre-assigned number for this configuration variable.

Here, the number assigned to configuration variable "M" is used, together with a "times 10" multiplier produced by operation of a divider 32 between Edge Count Comparator 28 and Temp Count Counter 35 (FIG. 1), to define the number of consecutive 200 .mu.sec windows in which detection of less than the "Max" number of edges must occur before the ASIC logic circuit 10 will mandate mode switching of the tag from its dominant R/W mode to the non-dominant RO mode. Once in the non-dominant RO state, the rule for switching back to the dominant R/W mode becomes "acceptance."

To determine whether the "reluctance" rule has been met (and similarly for the "acceptance" rule), two configuration variables that control the number of 200 .mu.sec windows need to be set. In this example of determining whether the reluctance rule is met, these variables or parameters are "M" and "Max". Selection (programming) of the variables is undertaken with a view toward developing a formula that makes the switch from the dominant (default) operating mode to the other operating mode considerably more difficult to achieve than to switch from the latter mode to the dominant mode. The formula inquires into the number of times an event occurs within a selected period of time, where the event is made relevant by the nature or type of the reader. For the presently preferred embodiment, that event is the existence of falling edges in the logic circuit-processed RF signal input to the tag from the reader. In addition, a preset or programmed threshold for the incoming RF signal also may play a role, albeit one of lesser significance, because the desire with respect to that aspect is to assure that the incoming signal is not signal interference from a distant source or merely noise. The RO (CW) threshold is of least interest because it is highly unlikely that either interference or noise will mimic a continuous wave signal.

The "acceptance" and "reluctance" rules, whichever may be applicable to a particular situation, are determined as follows. If the Dominant Bit=1 (i.e., RO mode dominant, which becomes the default mode of the tag), and the reader whose RF signal is detected is modulating, the rule for the tag to be switched to the R/W mode is stringent, i.e., reluctant. Let it be assumed that the acceptance rule to produce a switch from R/W mode back to the default RO mode is 10.times.M.times.200 .mu.sec where M is a 6-bit value in the range of 0<10.times.M.times.200 .mu.sec<126 msec. Conversely, if the Dominant Bit=0 (R/W mode made dominant, or the default mode), the reluctance rule for switching from R/W mode to the non-dominant RO mode might be 10.times.M.times.200 .mu.sec, where M is a 5-bit value in the range of 0<10.times.M.times.200 .mu.sec<62 msec. The values 126 msec and 62 msec pertain to the exemplary dwell time of the reader for processing data, as explained below. The point is that these values are matched to the system application, i.e., specific tag attributes.

In these two cases the acceptance factor and the reluctance factor are swapped, or reversed, depending upon which of the two modes is the dominant one. The difference in the number of bits used for the variable M is that in the second example, it is assumed that one bit is needed for another purpose and therefore sacrificed. This is acceptable. The M value is limited based upon logic gate resources, e.g., the larger the M value the more flip-flops are needed for the logic circuit. It is desirable, but not essential, to limit the number of logic elements to the minimum necessary to reasonably accomplish the task, for the purpose of reducing both size and cost of the tag.

Most RFID readers have short periods of time (dwell time) to process data after a command (an interrogation) is sent to activate a tag. Although dwell time varies from reader to reader, it is generally less than 10 msec. It is possible that a reader might have a dwell time larger than 126 msec, but in that circumstance, the application in which the tag is to be used would not be high speed. In this situation, the dwell time may surpass the m (or M) period defined by the formula in the immediately preceding paragraph, possibly making it necessary for the tag to be switched from the RO state before another R/W transaction can occur. Such a change would be necessary only if the dwell time of the reader exceeded m and the tag had moved from R/W mode to RO mode.

The variable N defines the number of consecutive 200 .mu.sec windows over which the Min and Max conditions must be met before the ASIC will switch modes, i.e., RO to R/W (but not vice-versa). The variable N establishes a key part of the "acceptance" rule or the "reluctance" rule, whichever may be applicable, and allows the ASIC 10 to be matched to the system application, and thereby, specific reader attributes. If the Dominant Bit=1 (RO mode dominant), the reluctance factor is N.times.200 .mu.sec. By way of example, N is a 6-bit value, and 0<N.times.200 .mu.sec<12.6 msec. If the Dominant Bit=0 (R/W mode dominant), the acceptance factor is N.times.200 .mu.sec. For this example, N is a 5-bit value, and 0< N.times.200 .mu.sec<6.2 ms.

The variable Min defines the minimum number of transitions (falling edges) needed or allowed in each 200 .mu.sec window before incrementing Temp_Count 35. Temp_Count is satisfied when it reaches N or M. The Min variable allows the ASIC to be matched to the system application/specific reader attributes, the RF footprint (which is the field pattern of the RF signal from the reader at the tag antenna) characteristics (e.g., nulls, rapid changes in field strength, and so forth.), and interfering AM (amplitude modulation) sources.

The variable Max defines the maximum number of transitions (falling edges) allowed in each 200 .mu.sec window before incrementing the Temp_Count. This variable similarly allows the ASIC to be matched to the system application/specific reader attributes, RF footprint characteristics, and interfering AM sources.

With reference again to FIGS. 1 and 2, the output waveform of data detector 25 is applied, together with edge_counter_input_enable, to NAND gate 36, which performs a logical multiplication to provide an edge_in clock to an edge-triggered D flip-flop 37. The negative edge-triggering is achieved by having a NAND gate in the circuit. Thus, flip-flop 37 changes state at the rising edge (negative edge out of the data detector 25) of each edge_in clock pulse, and is sensitive to its input at D only at this transition of the clock.

In the edge-triggered D type of flip-flop, a single bit of data is to be stored, if applicable, at each transition of the clock. The flip-flop 37 stores a 1 in the set state (this occurring when a high is on the D input at the time of the clock transition), and a 0 in the reset state (this occurring when a low is on the D input at the time of the clock transition). Output Q follows D at the clock edge, and is the input D to each of a pair of edge-triggered flip-flops 38, 39, with oso_ref and oso_ref not (the positive and negative phases of an internal clock), respectively. The Q output of each of the latter flip-flops is applied to OR gate 40, which performs logical addition of the two as an input to edge counter 42. The output of the logic circuit 10, at M/N comparator 34 is an instruction to the tag to change state (switch operating mode) based in part on the RF level of the input signal detected at antenna 12 and in further part on the respective values of the configuration variables that determine the logic circuit configuration as used in the establishment of the mode detection/switching rules.

The following summary of operation of a dual mode RFID tag implemented according to the principles of the present invention is presented by way of illustration and not limitation of the invention. The tag is adapted, by definition, for both RO and R/W operation, but has its ASIC 10 configured for a dominant operating mode of either RO (by programming or otherwise setting its dominant bit=1) or R/W (dominant bit=0). The other configuration variables Min, Max, N, and M may be programmed to respective values according to the rigidity or looseness (or something between the two) of the mode detection rules depending upon the application in which the tag is to be used and/or as desired by the user. In general, according to the invention, these rules will be established to make it easier (acceptant) for a tag to revert to its dominant mode, and harder (reluctant) to be switched to its recessive mode.

The remote RFID tag reader is either implemented (i) to transmit a continuous wave RF signal (i.e., a CW reader) to evoke a backscatter response of continuous, repetitive data from memory (e.g., EEPROM) in the tag, or (ii) to transmit an RF signal with modulation (i.e., a modulating reader) to selectively write selected data into and/or read selected data from the tag's memory, subject in either case to the reader being located within the response range of the tag for the respective signal. Typically, the reader has a fixed position and the tag (specifically, the product or article to which it is secured) is movable, but the arrangement for a given application may be vice versa, or both reader and tag may undergo movement. While it is anticipated that the tag will be subjected to separate queries by both CW readers and modulating readers, it is conceivable that a single reader may be implemented for selective transmission of CW or modulating signals, to read data in either operating mode of the tag.

Figure 3:
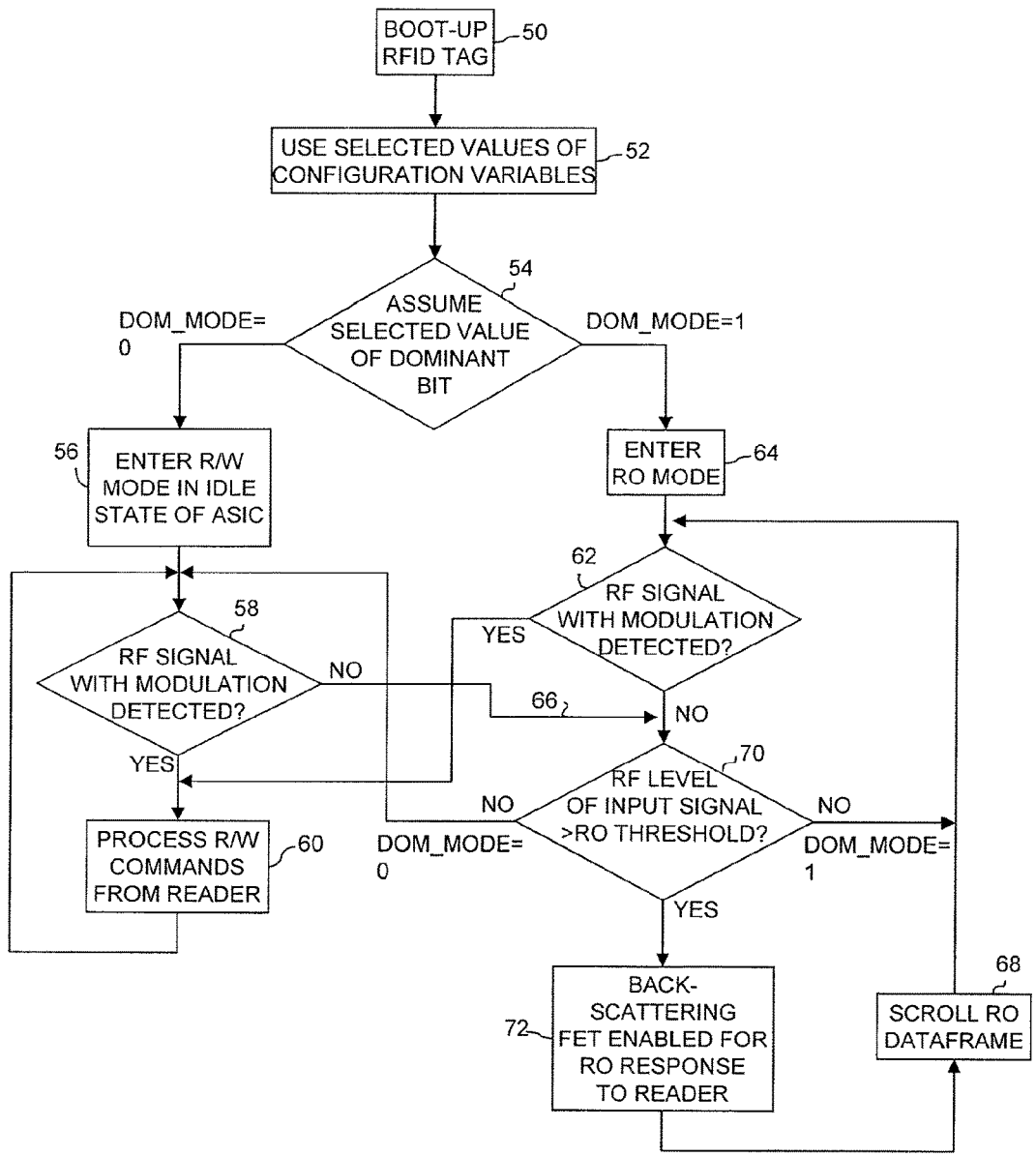
FIG. 3 is a flow chart illustrating operation of the circuit of FIG. 1 with the waveforms of FIGS. 2A-D, to achieve the mode detection and automatic mode switching of the invention.

Referring, for purposes of this illustrative summary of tag operation, to the flow diagram of FIG. 3, when the tag is activated (according to whether the tag is passive or active) the ASIC 10 is also booted up (at 50) with the selected values of the configuration variables (at 52), and the tag assumes its default mode (the selected dominant mode of operation), either RO or R/W as the case may be (at 54).

If the dominant mode is R/W (at 56), that operating mode is entered and the R/W state machine moves to the IDLE state. The IDLE state is defined as a span in which the R/W state machine is awaiting an R/W command, and as being the state that edges (or the lack thereof) are detected, used for determining whether a switch of modes is necessary. The edges detected must be less than max for an interval of ten times the designated value of the configuration variable M (i.e., a total of M.times.10) consecutive 200 .mu.sec windows before a switch to the RO mode can occur. The ASIC boots up and moves directly to this mode of operation when R/W mode dominant is designated by selection of the dominant bit=0.

The ASIC monitors any RF signal received as an input to the tag at its antenna to detect a query from either a CW reader or a modulating reader. When modulation is detected as a result of the R/W detection rule having been met (at 58), the ASIC continually processes R/W commands (at 56, 58 and 60), but it should be noted that actually, the idle state is included in every R/W command. The processing includes the writing (including overwriting of previously stored) and/or reading of data in the tag's memory according to the detected RF input signal, until no further modulation is detected during the IDLE state of the ASIC. It is deemed that no modulation is detected at the RF input from the tag antenna when a number of detected edges <Max have occurred in M.times.10 200 .mu.sec consecutive windows while the RO threshold is exceeded by the average RF level.

If this "no modulation detected" condition is satisfied, the reluctance threshold is overcome and the ASIC thereupon switches the tag to RO mode (at 66) and commences continuous scrolling of the RO frame data (at 68). The backscattering FET 15 (FIG. 1) is enabled (at 72) since the average RF signal level is above the read-only threshold (at 70) (according to the condition of "no modulation detected"), so a response is sent by the tag to the CW reader. The tag scrolls its RO frame until the switching criteria to resume R/W operation is satisfied or a loss of power occurs. It should be noted that the ASIC, even though designed for dual mode operation, might be configured RO mode only. In the dual mode configuration, the windows are always open to allow detection of a transmission from a reader. Thus, while the tag is activated, the ASIC is continuously monitoring (searching) for RF signals received at the tag's antenna to detect a condition of modulation or of no modulation and thereby cause the tag to switch to its other mode (here, R/W), or to continue in its then-current mode (here, RO), accordingly.

Once in the RO mode, either of two distinct conditions can cause the ASIC to return the tag to the R/W mode, viz.: (i) modulation is detected (at 62), or (ii) the average RF level falls below the RO threshold for the specified number of consecutive 200 .mu.sec windows (at 70). The latter may happen when RF holes occur in the normal RF footprint (i.e., either gaps in the RF signal field at the tag antenna as a result of the CW reader alternating between being in and out of the response range of the tag, or nulls in the RF field such as where an RF lobe of the reader's transmitting antenna has sufficient energy to activate the tag but objects somewhere in the lobe cause RF cancellation so that little or no RF energy is present at the tag).

If the dominant mode is read-only (at 64), the backscattering FET will be enabled if and when the RF level detected from an input signal via the tag's antenna is above the RO threshold (at 70), which would result in a backscatter response to the CW reader (at 72) in the form of a continuous transmission of the same data repeatedly from the tag's memory. The ASIC continuously scrolls the RO frame data while simultaneously allowing possible detection of a modulated RF input signal (at 62) from a modulating reader at the tag's antenna. Tag operation continues as described above.

Figure 4:
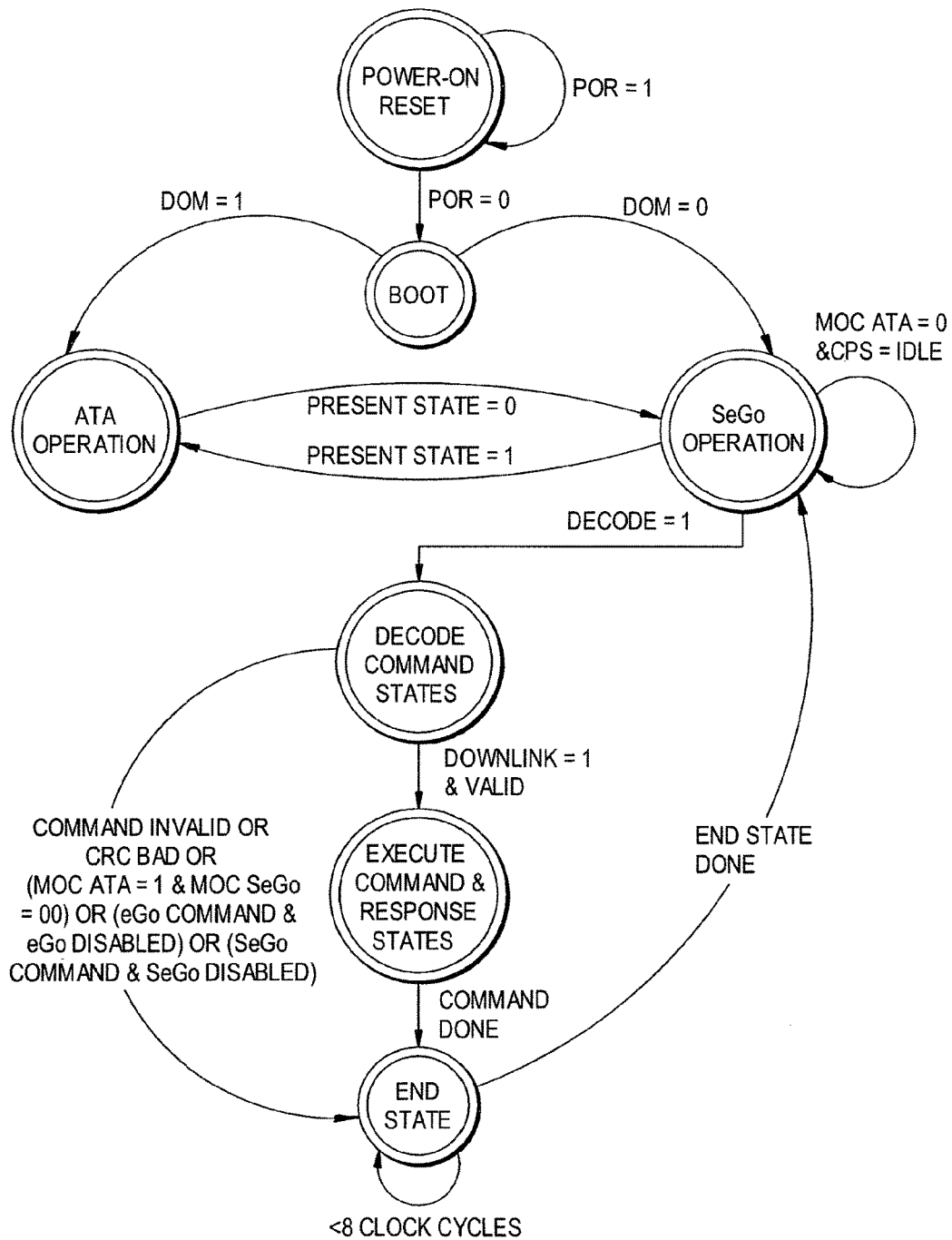
FIG. 4 is an executive state diagram that controls the execution of each operating mode.

An alternative and perhaps more straightforward summary of the dual mode tag's operation is illustrated by the state diagram of FIG. 4. Power-On Reset (POR) indicates a reset state in which the device has insufficient energy (POR=1) to be booted up. The tag is essentially waiting for receipt of an RF signal from a reader to cause the tag to boot up (POR=0). When it moves to the boot state, the tag commences to gather the configuration variables that are designated according to whether the dominant bit is set to dictate RO (DOM=1) or R/W (DOM=0) as its dominant operating mode. If the RO mode (shown in FIG. 4 as ATA operation) is dominant, the tag remains in that state (Present State=1), which means that the backscatter FET 15 (FIG. 1) is disabled. That condition of the tag continues unless and until the level of a detected incoming RF signal meets or exceeds the designated R/W RF threshold.

When the designated R/W RF threshold is met, the state machine recognizes that it is encountering a modulating reader and the tag switches from RO to the R/W state (Present State=0, shown in FIG. 4 as SeGo operation). The tag then cycles continuously in the R/W state until the criteria implemented by the detection rule indicate that the incoming signal level to the tag no longer meets the designated threshold (i.e., has either become weak or is no longer present), in which case the tag reverts to the RO state, or that a modulating command is being received to cause the tag (Decode=1) to enter the Decode Command State.

In the latter event, the criteria implemented by the rule determine whether the command is valid (e.g., frequency of occurrence of falling edges within the predetermined period is sufficient) and, if a detected cyclic redundancy code (CRC) is also correct, the tag executes the command and transmits in the proper response state for that command. If, however, the command is invalid, or the CRC is bad, the state machine enters the end state. And if the command was found to be valid and has been properly executed by the tag to produce the mandated response mode, the completion of the command is followed by entry into the end state. In either case, the tag remains in the end state for up to 8 clock cycles, and unless a new command is received in the interim, the tag returns to the R/W mode where it remains until the criteria of the detection rule dictate otherwise, as indicated above.

The following examples illustrate the operation of an ASIC associated with a dual mode RFID tag according to several presently preferred embodiments of the invention, with certain specific conditions and configurations of the ASIC. In many of these examples, it is assumed in the opening statement that only one reader (either CW or modulating) is involved in scanning the tag, but it will be understood that the point in each example (other than Example 1) is that the dual mode tag of the invention may come into the presence of either type of reader, and will respond accordingly.

ASIC Operation, Example 1

Assumptions of prevailing conditions for this example: RFID tag reader is a Transcore model AI1200/AR2200 (CW); ASIC is configured for RO dominant (Dom. Bit=1), with values Min=3, Max=8, N=2, M=7.

Following power-up and boot sequence, ASIC sets tag operation in RO mode, and backscattering FET is enabled when RF input signal level is above RO threshold. The RO data frame is scrolled 100 times (which happens only because the tag is configured in solely RO mode), and ASIC then opens a window for modulation detection. If no modulation detected, i.e., edges.gtoreq.3 and .ltoreq.8 did not occur in 2 consecutive 200 .mu.sec windows, scrolling of RO data is continued for another 100 frames before next window of opportunity for modulation detection is opened. But assumptions for this example have the RFID reader restricted to CW, so the ASIC would not switch the tag from the RO operating mode.

ASIC Operation Example 2

Assumptions of prevailing conditions for this example: The reader is a Transcore model AI2110 (read/write capable, i.e., modulating); and the ASIC is configured for RO dominant mode, with Min=3, Max=8, N=2, and M=7.

Following power-up and boot sequence, ASIC initiates RO mode; and backscattering FET is enabled when RF level above RO threshold. RO data frame is scrolled until detection of modulation. If no modulation detected, i.e., edges-.gtoreq.3 and .ltoreq.8 did not occur in 2 consecutive 200 .mu.sec windows, scrolling continues. But if modulation is detected, tag's operating mode is switched to R/W. ASIC processes all R/W commands until no modulation detected during an IDLE state, i.e., edges.gtoreq.3 not having occurred in (7.times.10=70) 200 .mu.sec consecutive windows. Tag then switched back to RO mode, and ASIC continuously scrolls RO data frame. Operation continues in RO mode until modulation detection, at which point R/W mode may be reinstated if applicable conditions satisfied.

ASIC Operation Example 3

Assumptions of prevailing conditions for this example: RFID tag reader is Transcore model AI1200/AR2200 (CW); RFID tag with ASIC configured for RO dominant mode, but tag capable of both RO and R/W modes, Min=3, Max=8, N=2, M=7.

Following the power-up and boot sequence, ASIC moves the tag to RO mode, and backscattering FET enabled when RF level above RO threshold. The ASIC continuously scrolls the RO frame data and simultaneously allows modulation detection, which occurs if the R/W threshold is exceeded by the average detected RF level and edges-.gtoreq.3 and .ltoreq.8 took place in 2 consecutive 200 .mu.sec windows, and if not, scrolling of RO data frame continues. If modulation detected by satisfying the above rule, the tag is switched to R/W mode. And once in R/W mode, all R/W commands are processed by the ASIC until no modulation detected during IDLE state, i.e., edges .ltoreq.3 occurring in (7.times.10=70) consecutive 200 .mu.sec windows, at which point tag is switched back to RO mode and scrolling of RO data.

ASIC Operation, Example 4

Assumptions of prevailing conditions for this example: Reader is Transcore model AI2110 (R/W capable, i.e., modulating); RFID tag's ASIC configured in RO dominant mode (Dom. Bit=1), adapted for both RO and R/W, Min=3, Max=8, N=2, and M=7.

Following power activation and boot sequence, ASIC places tag in the dominant RO mode. Backscattering FET enabled and ASIC continuously scrolls RO frame data while simultaneously allowing possible detection of modulated RF input signal. Such detection occurs if and when R/W detection rule has been met: R/W threshold exceeds average RF level and edges.gtoreq.3 and .ltoreq.8 within 2 consecutive 200 .mu.sec windows. If modulation not detected, ASIC continues scrolling data in RO mode. But if modulation detected, ASIC switches tag to R/W mode, and once there, ASIC processes all R/W commands. If no further modulation is detected, ASIC would normally switch tag back to RO mode. But in this example, tag remains in R/W mode since it is assumed that RFID reader is transmitting a modulating signal.

ASIC Operation Example 5

Assumptions of prevailing conditions for this example: Transcore AI1200/AR2200 reader (CW); ASIC configured for R/W dominant mode, R/W Only, Min=3, Max=8, N=2, M=7.

Following power-up and boot sequence, ASIC moves tag to R/W mode in IDLE state. Since reader is non-modulating, ASIC stays in IDLE state until the RF signal falls below R/W threshold or disappears altogether. Here, however, ASIC never switches tag to RO mode since ASIC configuration is set to R/W only.

ASIC Operation Example 6

Assumptions of prevailing conditions for this example: Transcore AI2110 reader (R/W capable, i.e., modulating); ASIC configured with R/W dominant mode, R/W Only, Min=3, Max=8, N=2, M=7.

Following power-up and boot sequence, ASIC switches tag to R/W mode in IDLE state. Detected RF level controls ability to receive commands and must exceed R/W threshold. In that case, ASIC processes all R/W commands until RF signal level falls below R/W threshold or disappears altogether. In this case, however, ASIC never switches tag to RO mode, since ASIC is configured for R/W only.

ASIC Operation Example 7

Assumptions of prevailing conditions for this example: Transcore AI1200/AR2200 reader (CW only); ASIC configured for R/W dominant, R/W and RO, Min=3, Max=8, N=2, M=7.

Following power-up and boot sequence, ASIC switches tag to R/W mode in IDLE state. Reader modulation can only be detected as previously described. If modulation detection mode is satisfied, ASIC continually processes R/W commands until no modulation detected. Thereafter, if the 10.times.7=70 edges in 200 .mu.sec windows condition is satisfied, the tag is switched to RO mode and commences scrolling its RO data. Then, either of two conditions cited above can cause return to R/W mode. But in this example, the ASIC switched the tag from R/W to RO mode, and no return to the R/W mode takes place until the RF level falls below the RO threshold since the reader is assumed to be CW and thus, non-modulating.

ASIC Operation Example 8

Assumptions of prevailing conditions for this example: Transcore AI2110 reader (R/W capable, i.e. modulating); ASIC configured for R/W dominant mode, R/W and RO, Min=3, Max=8, N=2, M=7.

Following power-up and boot sequence, ASIC moves tag to R/W mode in IDLE state. Reader modulation detected if modulation detection rule satisfied. If so, ASIC continually processes R/W commands until modulation detection ceases. Then, if specified conditions are satisfied, ASIC switches to RO and continuously scrolls its data. Thereafter, either of the two aforementioned conditions will cause tag to return to R/W mode. In this example, ASIC responds to the reader in either operating mode: R/W or RO.

The foregoing description and drawings should be considered as illustrative only of the principles of the invention. The invention may be configured in a variety of ways and is not intended to be limited by the preferred embodiments or methods. Numerous applications of the invention will readily occur to those skilled in the art from a consideration of the above description. Therefore, it is desired that the invention not be limited to the specific examples disclosed or the construction and operation shown and described. Rather, all suitable modifications and equivalents may be resorted to.

For example, under certain circumstances it may be that a RFID tag is implemented for more than two modes of operation. In the claims that follow, the term "multi-mode" is intended to include two or more modes, although dual mode is the preferred embodiment.

What is claimed is:

1. A radio-frequency identification (RFID) system, comprising:
   an RFID reader to transmit a modulated radio frequency (RF) signal and receive an RFID transponder-modulated RF response signal; and
   an RFID transponder comprising:
      a receiver configured to receive a continuous wave RF signal and said modulated RF signal; and
      a logic circuit configured to detect whether said receiver is receiving said continuous wave RF signal or said modulated RF signal and to cause the RFID transponder to transmit a first response when said continuous wave RF signal is detected and a second response when said RF modulated signal is detected,
   wherein said logic circuit is further configured to receive an input designating either one of said continuous wave RF signal or said modulated RF signal as a dominant mode and the other one of said continuous wave RF signal or said modulated RF signal as a recessive mode.

2. The RFID system of claim 1, wherein said modulated RF signal transmitted by said RFID reader includes a command and a cyclic redundancy check.

3. The RFID system of claim 1, wherein said modulated RF signal transmitted by said RFID reader is a command to write data to said RFID transponder.

4. The RFID system of claim 1, wherein said modulated RF signal transmitted by said reader is a command to read data from said RFID transponder.

5. The RFID system of claim 1, wherein said RFID reader incorporates a dwell time between receipt of said modulated RF response signal and transmission of a subsequent modulated RF signal.

6. The system of claim 5, wherein said dwell time is a minimum of 10 microseconds.

7. The RFID system of claim 1, further comprising a second RFID reader to transmit said continuous wave RF signal and receive a modulated backscattered RF response signal.

8. The RFID system of claim 2, further comprising a second RFID reader to transmit said continuous wave RF signal and receive a modulated backscattered RF response signal.

9. The RFID system of claim 3, further comprising a second RFID reader to transmit said continuous wave RF signal and receive a modulated backscattered RF response signal.

10. The RFID system of claim 4, further comprising a second RFID reader to transmit said continuous wave RF signal and receive a modulated backscattered RF response signal.

11. The RFID system of claim 5, further comprising as second RFID reader to transmit said continuous wave RF signal and receive a modulated backscattered RF response signal.

12. The RFID system of claim 6, further comprising a second RFID reader to transmit said continuous wave RF signal and receive a modulated backscattered RF response signal.

13. A radio-frequency identification (RFID) system, comprising:
   an RFID reader to transmit a continuous wave RF signal and receive a modulated backscattered RF response signal; and
   an RFID transponder comprising:
      a receiver configured to receive said continuous wave RF signal and a modulated RF signal; and
      a logic circuit configured to detect whether said receiver is receiving said continuous wave RF signal or said modulated RF signal and to cause the RFID transponder to transmit a first response when said continuous wave signal is detected and a second response when said modulated signal is detected,
   wherein said logic circuit is further configured to receive an input designating either one of said continuous wave RF signal and said modulated RF signal as a dominant mode and the other one of said continuous wave RF signal and said modulated RF signal as a recessive mode.

14. The RFID system of claim 13, wherein said RFID reader is configured to receive modulated backscattered RF response signals containing continuously scrolling data.

* * * * *